United States Patent [19]

James et al.

[11] Patent Number: 5,556,834
[45] Date of Patent: Sep. 17, 1996

[54] PERCARBONATE PARTICLES STABILIZED BY COATING WITH AN AQUEOUS SOLUTION CONTAINING A SILICATE AND A BORIC ACID

[75] Inventors: Alun P. James, Liverpool; Graham R. Horne, Warrington, both of England

[73] Assignee: Solvay Interox Limited, Warrington, England

[21] Appl. No.: 464,745

[22] PCT Filed: Dec. 15, 1993

[86] PCT No.: PCT/GB93/02551

§ 371 Date: Jun. 21, 1995

§ 102(e) Date: Jun. 21, 1995

[87] PCT Pub. No.: WO94/14701

PCT Pub. Date: Jul. 7, 1994

[30] Foreign Application Priority Data

Dec. 23, 1992 [GB] United Kingdom ............... 9226796

[51] Int. Cl.⁶ ............... C01B 15/10; C11D 7/04; C11D 7/14; C11D 7/18
[52] U.S. Cl. ............ 510/375; 423/415.2; 427/213; 427/215; 510/108; 510/441; 510/442; 510/509; 510/510; 510/511; 252/186.26
[58] Field of Search ............ 252/95, 99, 174.13, 252/186.26; 423/415.2; 427/213, 215

[56] References Cited

U.S. PATENT DOCUMENTS

| | | | |
|---|---|---|---|
| 4,194,025 | 3/1980 | Klebe | 427/215 |
| 4,321,301 | 3/1982 | Brichard | 428/403 |
| 4,526,698 | 7/1985 | Kuroda | 252/99 |
| 5,194,176 | 3/1993 | Copenhafer | 252/186.27 |
| 5,219,549 | 6/1993 | Onda | 423/415.2 |
| 5,332,518 | 7/1994 | Kuroda | 252/99 |

FOREIGN PATENT DOCUMENTS

| | | |
|---|---|---|
| 459625A1 | 12/1991 | European Pat. Off. . |
| 2376694 | 8/1978 | France . |
| 4116701 | 2/1992 | Germany . |

*Primary Examiner*—Dennis Albrecht
*Attorney, Agent, or Firm*—Larson and Taylor

[57] ABSTRACT

A process for stabilizing percarbonate by coating by means of a coating agent according to which the percarbonate particles are treated with a concentrated aqueous solution containing at least one boron compound selected from meta and ortho boric acids and at least one silicate, following by removal of water to provide coated percarbonate particles. The solution is prepared by adding the boron compound to a solution of the silicate. The coated particles are useful in washing and bleaching compositions.

15 Claims, No Drawings

PERCARBONATE PARTICLES STABILIZED BY COATING WITH AN AQUEOUS SOLUTION CONTAINING A SILICATE AND A BORIC ACID

The present invention relates to a process for stabilising alkali metal percarbonates by coating particles of alkali metal percarbonates, the coated alkali metal percarbonates thus obtained and washing or bleaching compositions containing such particles.

It is well known that percarbonates can be used as bleaching compounds in detergent powder mixtures. Compared with perborate tetrahydrate, they have the advantage of dissolving more rapidly at 20° C. Another advantage of the percarbonates is that they are environmentally friendly. However, the said percarbonates have the drawback of decomposing in the powdered state, particularly if stored in a damp atmosphere. Moreover, the other constituents of washing compositions can accelerate their decomposition.

In order to improve the stability of percarbonates, it has been proposed to coat the percarbonate particles with different types of coating agents. Organic and/or polymer compounds such as paraffins, polyols, vinyl resins etc. and inorganic compounds such as silicates, borates, perborates, boric acids etc. have been proposed as coating agent.

French patent published under number 2 528 447 describes coating the surface of sodium percarbonate with sodium borate. A process for coating sodium percarbonate consists of wetting the sodium percarbonate with water, mixing the damp sodium percarbonate with sodium borate in powder form and then drying them at a temperature above the melting temperature of the sodium borate used. This process requires a substantial amount of energy because of the high temperature required to melt sodium borates. In addition, the fact that the sodium percarbonate needs to be wetted requires strict control of its water content to prevent its decomposition.

Another coating method is described in British patent 1 575 792. This patent describes spraying boric acid solutions onto percarbonate particles or otherwise bringing them into contact. However, the solubility of boric acids in water is limited, particularly at ambient temperatures. Such low concentrations are disadvantageous for industrial use from the economic point of view because a large input of thermal energy is necessary to dry the percarbonate particles after spraying and because of the prolonged drying periods which cause a reduction in the active oxygen content of the percarbonate as a result of its decomposition.

European patent application 0 459 625 describes coating sodium percarbonate particles by spraying them with two distinct solutions, one comprising an aqueous solution of boric acid and the other a solution of an alkali metal silicate. According to this document, the simultaneous dissolution of boric acid and an alkali metal silicate in water is alleged to cause precipitation of a gel. Moreover, in this method of operation, the quantities of water to be eliminated are substantial on the one hand due to the fact that the solubility of boric acid in water is limited and, on the other hand, because two separate solutions are introduced. Furthermore, the homogeneity of the coating is not necessarily guaranteed. In addition, this technique is relatively complex due to the double introduction of solutions of coating agents.

It is an object of the present invention to provide a process for stabilizing percarbonate particles which ameliorates or overcomes the disadvantages of the above-mentioned processes. It is an object of at least some embodiments of the present invention to obtain a homogeneous coating of the percarbonate particles and to obtain in this way an alkali metal percarbonate which is particularly stable in the presence of the other constituents of detergent powders without, however, reducing to a substantial or significant extent its active oxygen content.

It is a further object of some or further embodiments of the present invention to enable the use of aqueous mixed solutions of boric acid and an alkali metal silicate which are sufficiently concentrated to encourage industrial interest, but in which gel formation does not take place at all or at most to an insignificant extent.

The present invention relates to a process for stabilizing particles of alkali metal percarbonate by coating by means of a coating agent, according to which the percarbonate particles are treated by means of a concentrated aqueous solution of the coating agent containing at least one boron compound selected from the meta and orthoboric acids and at least one silicate.

The best results are obtained when the coating agent contains at least one boron compound selected from the ortho and metaboric acids and at least one alkali metal silicate.

The proportion of boron compound used in the coating agent is generally 25 to 60% by weight calculated as $H_3BO_3$, based on the total weight of the coating agent. The best results are obtained when the proportion of boron compound is 30 to 50% by weight. Preferably, the quantities of boron compound used are from 40 to 50% by weight, based on the weight of the coating agent.

The alkali metal silicate used in the coating agent can be a potassium silicate and preferably is a sodium silicate. Generally, the sodium silicate used in the coating agent is a sodium silicate whose molar ratio of $Na_2O/SiO_2$ is 0.2 to 2.0. Preferably, the sodium silicate is a sodium silicate whose molar ratio of $Na_2O/SiO_2$ is above 0.33. Sodium silicates whose molar ratio of $Na_2O/SiO_2$ is 0.5 to 2.0 are particularly preferred. Good results are obtained with silicates selected from sodium metasilicate, sodium orthosilicate, sodium sesquisilicate and mixtures of two or more thereof. Such silicates can be employed as such or formed by mixture of silicates containing a lower ratio of $Na_2O:SiO_2$ with soda. Herein, it is possible to employ the corresponding potassium silicates, ie those with $K_2O/SiO_2$ ratios similar to the $Na_2O/SiO_2$ ratios described, or mixtures of potassium and sodium silicates.

The quantity of silicate used in the coating agent is generally 38 to 75% by weight, based on the total weight of the coating agent. The best results are obtained when the proportion of silicate is 40 to 70% by weight. Preferably, quantities of 48 to 60% by weight, based on the weight of the coating agent, are used.

The selection of the soda/silica ratio in the sodium silicate used in the coating agent is often made in conjunction with the proportion of boron compound used in the coating agent.

The sodium silicate and proportion of boron compound are often the molar ratio of $B:Na_2O:SiO_2$ is 1:0 1 to 2:0.2 to 2.6 selected together from the compounds described above in such a way that The high ratios of $Na_2O/SiO_2$ are selected in conjunction with high proportions of boron compound; lower ratios of $Na_2O/SiO_2$ are often selected in conjunction with lower proportions of boron compound.

In practice, the concentration of coating agent, i.e. the total of silicate and boron compound and any optional other constituent, in the aqueous coating solution is at least half of, and preferably as close as possible to, its saturation concentration of the solution at the application temperature. In this way, a smaller and preferably the smallest possible quantity of water needs to be evaporated subsequently to produce dry percarbonate particles, and thereby requiring least heat input. The concentration of coating agent in the aqueous coating solution is generally at least 15% by weight, preferably at least 20% by weight. Concentrations above or equal to approximately 25% by weight are particularly advantageous, and for certain silicate/boric acid coatings agents it is possible to employ solutions thereof at 40% w/w or higher, such as up to about 52% in favourable conditions.

In order to prevent the formation of gels, or at least minimise their formation, the constituents of the coating agent are preferably dissolved in a particular order. All or most of the silicate is first dissolved in an aqueous solution, and the boric acid is subsequently introduced therein.

The dissolution can take place conveniently at a temperature of from 15 to 95° C., and preferably from 20° to 70° C.

In addition, the coating agent may contain other compounds that are capable of exhibiting a stabilizing action on percarbonates. Among these, phosphates can be used in particular. Such additional constituents of the coating agent can be introduced in the same solution or in a further solution or solution employed simultaneously or sequentially with the silicate/boron compound solution.

The phosphates that are optional constituents of the coating agent are usually selected from phosphoric acids and orthophosphates, pyrophosphates, tripolyphosphates, trimetaphosphates, tetrapolyphosphates, tetrametaphosphates, dimeric phosphorus pentoxides, alkali metal, alkaline earth metal, earth metal and ammonium hexametaphosphates and polymetaphosphates and mixtures of two or more of the foregoing phosphorus-containing compounds. Good results are obtained with alkali metal, alkaline earth or ammonium phosphates and the mixtures thereof. The phosphates used in the coating agent are preferably those selected from sodium, potassium and ammonium phosphates and mixtures of at least two compounds thereof. The phosphates used in the coating agent which are particularly preferred are sodium orthophosphates selected from tribasic sodium phosphate, sodium hydrogen phosphate, sodium dihydrogen phosphate and mixtures of at least two compounds thereof.

The proportion of phosphate used in the coating agent generally does not exceed 10% by weight based on the total weight of the coating agent. The best results are obtained when the proportion of phosphate does not exceed 3% by weight based on the weight of the coating agent.

When phosphate is employed in a single coating agent solution containing the silicate and boron compound, it can be added to the aqueous solution containing the silicate before or after the addition of the boric acid.

The quantity of coating agent used usually represents 0.5 to 20% w/w of the coated percarbonate. Preferably, the quantity is selected in the range of from 1 to 15% w/w and in many instances from 2 to 15% of the coated percarbonate to give optimum results.

In some embodiments, the percarbonate particles are coated with a relatively small quantity of coating agent, such as from about 2% w/w to about 6% w/w, which ensures that the percarbonate particles initially can enjoy a high active oxygen content (Avox). In other embodiments, where the percarbonate is intended to be stored in an especially aggressive environment, such as alkaline detergent compositions containing a substantial proportion of aluminosilicate builders for use in hot and humid climates, it can be desirable to increase the total weight of coating to over 7% such as within the range of from about 7% to 12% w/w. The initial Avox of the percarbonate is lowered, but its ability to retain Avox is particularly good.

The alkali metal percarbonate is preferably sodium percarbonate.

The particulate percarbonate that is suitable for coating in any process according to the present invention can have been prepared in any process known as such for making an alkali metal percarbonate, e.g. by the direct method, by fluid bed processes, or the so-called wet processes in which percarbonate is crystallised from a saturated aqueous solutions, often by cooling and/or by addition of an alkali metal salt.

The percarbonate core particles which are coated by a process according to the present invention can incorporate various additives in a wide range of proportions and in accordance with known teachings and/or practice. Such additives include, amongst others, persalt stabilisers, crystal habit modifiers and salting out agents.

Persalt stabilisers can be selected from one or more of alkali metal and alkaline earth metal silicates, alkali metal and alkaline earth phosphates, magnesium compounds such as magnesium sulphate, chloride or oxide, organic complexing carboxylic acids and their salts, such as ethylene diamine tetraacetic acid and/or salt, or diethylenetriaminepentaacetic acid and/or salt and/or organic polyphosphonate complexing agents such as hydroxyethylidenediphosphonate, and alkyleneaminopolymethylenephosphonates, including ethylenediaminetetramethylenephosphonic acid (EDTMPA) and/or a soluble salt thereof, diethylenetriaminepentamethylenephosphonic acid (DTPMPA) and/or a soluble salt thereof, cyclohexane-1,2-diaminetetramethylenephosphonic acid (CDTMPA) and/or a soluble salt thereof.

In some highly desirable embodiments, the process of the present invention is employed to coat sodium percarbonate that has been produced by a manufacturing/stabilizing process described either in British Patent Specification No 1 553 505 (A), published in the name of Interox Chemicals Limited or in British Patent Specification No 1 578 062 (A), published in the name of Peroxid-Chemie GmbH, in both of which the percarbonate contains a small amount of up to about 0.5% w/w silicate distributed within its particles and a further small amount of up to about 0.5% of a silicate or silicate derivative on the surface of its particles, as a result of the timing and distribution of the addition of silicate in two stages during the crystallisation and recovery of the particulate percarbonate.

Crystal habit modifiers act on the morphology of the percarbonate crystals and include organic polymeric compounds like polyacrylates and inorganic species such as polyphosphates eg sodium hexametaphosphate.

Salting out agents are used during the crystallisation of the percarbonate from solution in wet processes, and typically are highly water-soluble alkali metal salts, such as sodium chloride, sodium sulphate, and/or sodium hexametaphosphate.

It will be understood that some agents can simultaneously provide a number of different properties, such as stabilisation and crystal habit modification. It will be further recognised that certain of the neutral salts employed in the present invention to improve the solubility of boric acid in the coating can be present also within the percarbonate core as a result of, for example, salting out operations.

The average diameter of the percarbonate particles to be coated is generally 100 to 2000 μm, preferably 200 to 1500 μm and in particular 250 to 1000 μm, such as commercially available percarbonate having an average particle size of about 500 μm or about 550 μm.

The spread of percarbonate particles is at the discretion of the percarbonate producer. As a practical matter, and as has been realized for many years, it is advantageous for incorporation in particulate detergent compositions to avoid very fine particles, sometimes referred to as fines, such as particles of below about 100 or 150 μm, because such particles are inherently more susceptible to environment-induced decomposition—they present a much higher surface area to volume ratio than larger particles. For many particulate detergent compositions, it is also desirable to avoid or minimise particles larger than about 1500 μm, to reduce potential problems of persalt/detergent particle segregation and to avoid excessively slow dissolutions rates. Thus, in many practical embodiments of the present invention all or substantially all the percarbonate to be coated can pass through a sieve of 1500 μm and be retained on a sieve of 150 μm, and in some of which or other embodiments at least 80% w/w is retained on a sieve of 350 μm and passes through a sieve of 1 000 μm, The process according to the present invention by which percarbonate particles are coated with the coating agent described above can comprise any method known in itself for contacting persalts with coating agent solution. A preferred means for bringing the coating agent into contact with the percarbonate comprises distributing an aqueous solution of the coating agent onto the percarbonate particles, for example by spraying. It is particularly desirable for the percarbonate particles to be kept in motion. Thus, a coating process of the present invention can desirably be carried out in a range of apparatuses that can agitate particles, of which practical examples include a fluid bed, a rotating plate, and a rotary mixer into each of which it is convenient to spray the coating agent solution. During the course of the contact, the persalt tends to adsorb, and to some extent absorb the coating agent solution and with subsequent or simultaneous evaporation of the solvent from the coating agent solution, a coating is deposited around the percarbonate core.

It will be recognised that the invention coating process may be conducted in a single pass through the coating apparatus or in a plurality of passes, at the discretion of the user. A plurality of passes, such as from 2 to 4 passes is particularly beneficial for application of a heavy coating, for example a total coating of around 10% w/w or more, in that it reduces the amount of solvent that need be removed in each pass and thus reduces or removes the risk of over-wetting the percarbonate before it is dried. A continuous or batch method can be used.

An apparatus such as a fluid bed is particularly suitable for carrying out evaporation or simultaneous spraying and evaporation. In such a case, the temperature of the fluid bed is usually maintained in the range of 30° to 95° C. and preferably 60° to 80° C.

One particularly convenient process variation comprises spraying a solution of the invention coating agent in a separate mixer, particularly a rotary mixer, and drying of the wetted percarbonate subsequently in a fluid bed. In this variation, the temperature in the mixer is often selected in the range of 10° to 60° C. and preferably 20 to 50° C. Drying in the fluid bed is then conveniently carried out at a temperature of 50° to 90° C. and preferably of from 60° to 70° C. The process variation employing a mixer followed by a fluid bed drier is particularly suitable for a multi pass application of coating agent to percarbonate.

The fluid bed employed herein either for a combined coating/drying process or simply in the drying stage can be operated in accordance with known procedures for coating/drying or simply drying persalts, as the case may be. Thus, any non-reactive gas can be used as the fluidising gas, including air in particular. The gas can be pre-dehumidified, if desired, and pre-heated to maintain the temperature of the fluid bed at the desired value. It is also possible to use direct heating means for the fluidised bed, such as a tube bundle placed within the fluid bed or a heated jacket around the bed. The upward airflow of fluidising gas is regulated to maintain the percarbonate particles in an agitated state, ie not settling, but is not so great as to blow the particles, other than fines, out of the fluidising vessel.

The aqueous coating solution is generally brought into contact with the percarbonate particles at a temperature that is within about 30° C. of the particles and often within about 5° C. of each other.

The proportions of coating agent solution and percarbonate are chosen so as to leave, after drying, the desired weight of coating agent around the percarbonate core. In practice, it is desirable to limit the addition of solution to percarbonate in a fluid bed or mixer to a maximum water content of about 18% w/w so as to minimise or eliminate wetting out problems, more preferably to an amount selected in the range of about 5 to 12% w/w water and often from about 8 to 12% w/w water. It is normally desirable also to continue drying until the coated percarbonate has a moisture content of below about 1% w/w, such as in the region of 0.1 to 0.7% w/w. The duration of the drying stage is usually determined by such practical considerations as, amongst others, the amount of coating agent solution being applied per unit weight of percarbonate, the residual content of moisture that will be tolerated, the temperature and moisture content of the influent fluidising gas, whether additional heating is employed for the bed and the rate at which the gas flows through the bed. It will accordingly vary from apparatus to apparatus and be capable of control by a skilled person in the art of coating persalts with the aid of preliminary ranging trials.

It will naturally be recognised that the final form of a coating agent on percarbonate may change as a result of subsequent reaction or processing. Thus, for example, contact of a solution of an acidic coating agent on the surface or in the surface layer of percarbonate, an alkali, as in the aforementioned British Patent Specification 1 575 792, may result in the interaction of the acid with the alkali, and that the drying stage can release water of hydration from some or all hydrated salts that might be expected to be present at ambient temperature, provided that the drying temperature exceeds the transition temperature for such salts. Accordingly, the present invention includes any coated percarbonate in which the coating agent has undergone any such processes in situ.

The present invention also relates to the coated percarbonate thus obtained.

The present invention also relates to washing or bleaching compositions containing particles of coated sodium percarbonate, such as those according to the present invention described hereinabove and/or produced by the process according to the present invention hereinabove.

In many preferred compositions according to the present invention, one or more of the composition components are selected within the following narrower bands:

| | |
|---|---|
| percarbonate | 2 to 40%, particularly 5 to 30% |
| surfactant | 2 to 40%, particularly 5 to 25% |
| builder | 1 to 60%, particularly 5 to 40% |
| diluent | 1 to 70%, particularly 5 to 50% |
| additives | 1 to 10% in total. |

The surfactants for incorporation in solid compositions of the present invention can be selected from particulate or flaky anionic, cationic, nonionic, zwitterionic, amphoteric and ampholytic surfactants and can be either natural soaps or synthetic. A number of suitable surfactants are described in chapter 2 of Synthetic Detergents by A Davidsohn and B. M. Milwidsky (6th edition) published in 1978 by George Godwin Ltd and John Wiley & Sons, incorporated herein by reference. Without limiting to these surfactants, representative sub-classes of anionic surfactants are carboxylic acid soaps, alkyl aryl sulphonates, olefin sulphonates, linear alkane sulphonates, hydroxy-alkane sulphonates, long chain and OXO alcohol sulphates, sulphated glycerides, sulphated ethers, sulpho-succinates,alkane sulphonates, phosphate esters, sucrose esters and anionic fluorosurfactants; representative classes of cationic surfactants include quaternary ammonium or quaternary pyridinium salts containing at least one hydrophobic alkyl or aralkyl group, representative classes of nonionic surfactants include condensates of a long chain alkanol with either polyethylene oxides or with phenols, or condensates of long chain carboxylic acids or amines or amides with polyethylene oxide, and related compounds in which the long chain moiety is condensed with an aliphatic polyol such as sorbitol or condensation products of ethylene and propylene oxides or fatty acid alkanolamides and fatty acid amine oxides; representative classes of amphoteric/zwitterionic surfactants include sulphonium and phophonium surfactants, optionally substituted by an anionic solubilising group. The proportion of surfactant, expressed as a fraction of all the surfactant present is often from $^2/_{10}$ to $^8/_{10}$ths anionic, from 0 to $^6/_{10}$ ths nonionic, and from 0 to $^3/_{10}$ths for the other surfactants.

Detergent builders that are suitable for inclusion in compositions according to the present invention include specifically alkali metal phosphates, particularly tripolyphosphate but also tetrapyrophosphate and hexametaphosphate, especially the sodium salt of each, alkali metal, preferably, sodium carbonate, alkali metal, preferably, sodium borates, and siliceous builders including clays like bentonite, zeolites such as X, Y and MAP zeolites (EP-A-0 552 053) and layered silicates such as the product available under the trade designation SKS6. The coatings achievable with the boric acid-containing agents of the present invention render sodium percarbonate that has been so coated at higher levels particularly suited to incorporation in the relative aggressive detergent compositions, ie those containing siliceous builders. Useful detergent compositions can also include organic chelating builders include nitrilotrisodium triacetate (NTA), EDTA, EDTMP and DTPMP. Such chelating builders can be employed in a relatively small amount as an augmenting builder and peroxygen stabiliser, such as of 1 to 10%.

The detergent compositions can also contain diluents, in an amount usually of not more than about 50% w/w. Such diluents include sodium and magnesium sulphate and are less favoured than previously by manufacturers of detergent compositions, who in recent years have promoted concentrated compositions.

Detergent compositions of the present invention can also contain other substances selected for dedicated purposes in detergent compositions, which in some instances are referred to collectively as detergent additives. Among such additives, the following can be mentioned: persalt activators, optical brighteners, foam inhibitors, enzymes, fading inhibitors and antiredeposition agents, colorants, pH regulators. Such additives for incorporation in persalt-containing detergent compositions have been described in greater detail in Chapter 4 and exemplified in Chapter 7 of the aforementioned work by Davidsohn and Mildwidsky and are well known to skilled practitioners. Thus, for example, the bleach activator is typically a compound which generates a peroxyacid or an anion thereof by reaction with the percarbonate and is employed in a mole ratio of about 4:1 to 1:2 percarbonate:activator for monoactivating activators and proportionately for multiactivating activators. The range of activators a1 to a20 described by Solvay Interox Ltd in EP-A 0 565 017 can be employed herein, including TAED, SNOBS, sodium isononoyloxybenzenesulphonate, TAGU or sugar esters. Another type of activator for washing/bleaching compositions comprises certain transition metal salts and/or complexes, for example certain manganese, cobalt, and titanium complexes, sometimes employed in conjunction with a calcium promoter, as described in European Patent Application-A-O 272 030. Commonly used optical brighteners include stilbene derivatives. Commonly used optical brighteners include stilbene derivatives. Common antiredeposition agents include carboxymethyl cellulose and polyvinyl pyrrolidone.

The washing and/or bleaching compositions can be employed for washing and or bleaching operations, such as for domestic laundry in accordance with currently described operation conditions for persalt containing compositions.

The use of the percarbonate particles coated according to the invention in washing and bleaching compositions is particularly indicated due to the improved stability of the coated percarbonate in the presence of other constituents of the washing powders; no substantial reduction in its active oxygen content has been observed and its bulk density as well as its rate of dissolution in the washing medium are appropriate. The bulk density of the percarbonate coated according to the invention is generally 0.8 to 1.2. The rate of dissolution of the percarbonate coated according to the invention is determined according to international standard ISO 3123-1976. The time corresponding to a 90% dissolution of the sample of percarbonate coated according to the invention does generally not exceed 2.5 minutes.

Certain embodiments of the present invention are described hereinafter in greater detail by way of illustration only and do not represent any restriction. The Examples given below demonstrate the remarkable results obtained as a result of the present invention.

Examples 1 to 4, 6 to 9 and 11 have been carried out according to the present invention. Comparisons C5, C10 and C12 are given for comparison purposes only.

EXAMPLE 1

144.2 g sodium metasilicate pentahydrate ($Na_2O.SiO_2.5H_2O$) and 54.5 g sodium hydroxide (NaOH) was added with agitation to 750 g demineralised water. 125 g orthoboric acid ($H_3BO_3$) were then added to the solution. The solution was heated to 55° C. and then agitated for a further 5 minutes at that temperature. All the boric acid dissolved and remained in solution even after cooling of the solution to ambient temperature.

EXAMPLE 2

The process of Example 1 was repeated except that the quantity of water used was 700 g and that the solution was heated to a temperature of 65° C. All the boric acid is dissolved and remains in solution even after cooling of the solution to ambient temperature.

EXAMPLE 3

The process of Example 1 was repeated except that the quantity of water used was 650 g and that the solution was heated to a temperature of 65° C. All the boric acid is dissolved and remains in solution even after cooling of the solution to ambient temperature.

EXAMPLE 4

1 kg sodium percarbonate particles produced by a crystallisation process (Grade A) was used. The preformed particles were coated by a batchwise process in a fluid bed. The temperature of the fluid bed was maintained at 70° C. Coating was carried out with the gradual introduction of 211 ml of the 25% by weight solution containing boric acid and sodium silicate described in Example 1. After 30 minutes coating, the coated percarbonate particles were removed from the fluid bed.

The characteristics of the coated percarbonate obtained in this Example are summarised in Table 1 below.

COMPARISON C5

The characteristics of the uncoated sodium percarbonate, i.e. a further sample of the feed stock percarbonate particles employed in Example 4 were determined by the same methods and are summarised in Table 1 below by way of comparison.

In Table 1, the characteristics have the following meanings:

(1) % by weight coating agent based on the weight of the coated percarbonate (2) The active oxygen content (AvOx) is determined by the method of $KMnO_4$ titration.

(3) T90 corresponds to the time required for dissolving 90% of a sample of sodium percarbonate in demineralised water at 15° C., determined according to the international standard ISO 3123-1976.

(4) The stability of the sample is determined by comparing its active oxygen content after 48 hours storage under standardised conditions with the initial active oxygen content. The standardised conditions are:

the sample of sodium percarbonate (90 parts w/w) was mixed with zeolite 4A (10 parts w/w) and stored in a polyethylene vial fitted with a lid having a pinhole vent.

the sample was kept at 40° C. and a relative humidity of 80%.

TABLE I

| Ref | Coating Type | Content % by wt (1) | AvOx (2) | (min) (3) | Bulk Density gcm$^{-3}$ | Stability % Retained (4) |
|---|---|---|---|---|---|---|
| Ex 4 | 1 solution | 5% | 13.0 | 1.5 | 0.98 | 97 |
| C5 | — | | 13.7 | 1.1 | 1.02 | 77 |

From Table 1, it can be seen that product obtained by coating according to the present invention had markedly superior storage stability compared with the reference, uncoated product.

EXAMPLES 6 to 9

In these Examples, solutions were made which were suitable for coating sodium percarbonate and which provided a 50:50 mixture of $H_3BO_3:2Na_2O.SiO_2$. In each Example, sodium metasilicate pentahydrate (14.42 g), sodium hydroxide pellets (5.44 g) together equivalent to sodium orthosilicate, were mixed with boric acid (12.51 g) and the weight of water indicated below in a stirred beaker on a hot plate. The temperature of the mixture was slowly increased until the solids were seen to have dissolved, and the temperature of the solution at that point was recorded.

TABLE 2

| Example No. | Weight of water (g) | Temperature °C. | Nominal Concentration of coating agent (% w/w) |
|---|---|---|---|
| Example 6 | 51.09 | 45 | 30 |
| Example 7 | 30.26 | 50 | 40 |
| Example 8 | 23.32 | 52 | 45 |
| Example 9 | 17.76 | 45 | 50 |

In Examples 6 to 8, the composition remained as a solution even upon being allowed to cool to laboratory ambient temperature, but a precipitate was viewed in Example 9, which redissolved on reheating.

These Examples demonstrate the possibility of producing solutions containing high concentrations in total of boric acid and sodium silicate which can be used to coat sodium percarbonate.

COMPARISON 10

In this comparison, the coating procedure of Example 5 was repeated, but using a coating solution derived from sodium metaborate tetrahydrate (278.7 g) instead of ortho boric acid (125 g). In other respects, the coating solution and the coating procedure was the same. Consequently, the coating contains the same level of B and Si in Example 5 and Comparison 10.

The suitability of coated percarbonate for bulk storage was tested by measuring its heat output using an LKB isothermal microcalorimeter and the results summarised in Table II below. The suitability of the coated percarbonate for incorporation with other ingredients in a washing or bleaching composition was determined by a more prolonged storage trial under the conditions specified for Table I with a detergent base composition which contained carbonate and Zeolite 4A builders.

The results after 6 weeks storage are given.

TABLE 3

| | Heat Generation LKB – 40° C. | AvOx Stability % AvOx Retention | |
|---|---|---|---|
| Ref | μW/g | 2 weeks | 6 weeks |
| Ex 5 | 9.1 | 94 | 71 |
| Comp 10 | 124 | 91 | 63 |

From Table 3 it can be seen that the comparison product generates heat during the heat generation test at over 10 times the rate for the invention product of Example 5, thereby demonstrating the poor bulk storage capability of the comparison product and the very acceptable capability of the Example product. It can also be seen that the comparison product was consistently less able to retain its peroxygen content during storage, an inferiority of 3% after 2 weeks increasing to 8% after 6 weeks.

EXAMPLE 11 COMPARISON 12

In this Example and Comparison, two further coating trials were conducted under identical conditions as described in Example 5. The coating solution (210.5 g) was sprayed onto the bed of sodium percarbonate particles (1 kg, Grade A material) maintained at 70° C., providing a coating of 5% w/w. In Example 11, the coating solution comprised sodium metasilicate pentahydrate ($Na_2O.SiO_2.5H_2O$, 144.2 g), sodium hydroxide pellets (54.5 g) orthoboric acid ($HBO_3$, 125 g) and water (676.3 g) to produce a 25% w/w solution. In Comparison 12, the boric acid was replaced by sodium metaborate ($NaBO_2.4H_2O$, 169.2 g) and the amount of water was reduced to 632.1 g.

The products thereby obtained were tested for heat emission and pack stability in the same way as for Comparison 10, and the results summarised in Table 4 below.

TABLE 4

| Ref | Heat Generation LKB – 40° C. μW/g | AvOx Stability % AvOx Retention | |
|---|---|---|---|
| | | 2 weeks | 6 weeks |
| Ex 11 | 9.0 | 97 | 80 |
| Comp 12 | 92 | 92 | 72 |

From Table 4, it can again be seen that the Comparison product is much less suitable for bulk storage, emitting more than 10 times the heat output of the Example product, and similarly the pack stability of the Comparison product was inferior, a deficiency of 5% after 2 weeks increasing to 8% after 6 weeks.

EXAMPLES 13 AND 14

In these Examples, a Lodige M5 mixer was charged with a sodium percarbonate feed stock (1 kg) in which 90% by weight of the particles were within the range of 850 to 425 microns diameter measured using a standard sieve tower, less than 2% over 850 microns and less than 1% below 250 microns. The specified boric acid/sodium silicate solution was poured gradually over 5 minutes into the mixer with its stirrer blade rotating at about 100 rpm on the scale at a temperature of 40° C. for the stirred bed, to provide eventually 5% by weight of coating agent on the percarbonate particles.

In Example 13, 150.4 g of coating solution was introduced, which had been made from 144.1 g $Na_2O.SiO_2.5H_2O$; 54.3 g NaOH; 125 g $H_3BO_3$; 391.9 g water. In Example 14, 117.0 g of coating solution was introduced, which had been made from 144.1 g $Na_2O.SiO_2.5H_2O$; 54.3 g NaOH; 125 g $H_3BO_3$; 233.2 g water.

The dampened sodium percarbonate particles were transferred to a laboratory scale Aeromatic fluid bed drier, where they were fluidised with an updraft of pre-heated air to maintain a bed temperature of 70° C. for 30 minutes.

It was found on checking the particle size distribution that the distribution had shifted somewhat in favour of larger particles. The product of Example 13 still had over 90% by weight of its particle diameters below 1000μ of which 74% was in the range of 850 to 425μ. The change for the Example 14 product was even smaller. Over 98% by weight of particle diameters were below 1000μ and about 87% of particle diameters by weight fell into the range of 850 to 425μ.

It can be seen, therefore that in both of these Examples, it was possible to coat with a suitable weight of coating without producing undue agglomeration of the product.

EXAMPLE 15

In this Example, the process of Example 13 was repeated, but employing a boric acid/potassium silicate solution prepared from boric acid (100 g), water (653 g) and potassium silicate (commercial material available under the trademark "Pyramid K84" of $K_2O:SiO_2$ mole ratio 2:1—134.2 g plus KOH—113.3 g). The resultant product from 103 g of the solution on 1 kg particulate PCS provided a 3% w/w coating.

The coated product retained 67% avox after 4 weeks storage at 32° C. and 80% relative humidity in the presence of an aggressive American zeolite-containing base detergent. The effectiveness of the coating can be gauged in that in a trial with a further sample of the same detergent base, a product produced in a repeat of the method of Example 13, but providing a 4% w/w coating, retained 70% Avox after 4 weeks storage under the same conditions.

We claim:

1. Process for stabilizing alkali metal percarbonate particles by coating the particles with a coating agent, which comprises:

contacting alkali metal percarbonate particles with an aqueous solution of a coating agent prepared by dissolving at least one boric acid selected from the group consisting of meta and ortho boric acid in a solution of an alkali metal silicate having a molar ratio of alkali metal:silicate of from 0.2:1 to 2:1, the amount of boric acid and alkali metal silicate being such that boric acid, calculated as $H_3BO_3$, constitutes from 25–60% of the total amount of alkali metal silicate and boric acid and such that the total amount of boric acid and alkali metal silicate is at least 15% by weight based on the weight of the aqueous solution; and removing water to form a coating of the coating agent on the percarbonate particles, the amount of coating agent coated on the particles being about 0.5 to 20% by weight, based on the weight of the coated alkali metal percarbonate particles.

2. Process according to claim 1 wherein the alkali metal percarbonate comprises sodium percarbonate.

3. Process according to claim 1 wherein the silicate comprises a sodium silicate whose molar ratio of $Na_2O/SiO_2$ is above 0.33.

4. Process according to claim 3, wherein the silicate comprises a sodium silicate selected from sodium orthosilicate, sodium metasilicate, sodium sesquisilicate and the mixtures thereof.

5. Process according to any one of claims 1 to 4, wherein the coating agent contains 38 to 75% by weight of the alkali metal silicate based on the total weight of the coating agent.

6. Process according to any one of claims 1 to 4, wherein the molar ratio of $B:Na_2O:SiO_2$ in the coating agent is 1:0.1 to 2:0.2 to 2.6.

7. Process according to any one of claims 1 to 4, wherein the coating agent contains, in addition, a maximum of 10% by weight, based on the total weight of the coating agent, of a phosphate selected from sodium, potassium and ammonium phosphates and mixtures thereof.

8. Process according to any one of claims 1 to 4, wherein, the coating agent concentration of the aqueous solution of coating agent is in the vicinity of the saturation concentration at the temperature at which it is used.

9. Process according to any one of claims 1 to 4, wherein said contacting is carried out by spraying said aqueous solution onto the percarbonate particles.

10. Process according to claim 9 wherein the percarbonate particles are maintained in a fluid bed during said contacting.

11. Process according to claim 10 wherein the temperature of the fluid bed is 30° to 95° C.

12. Process according to any one of claims 1 to 4 wherein said contacting is carried out in a mixer and said removing water is carried out by drying the coated particles in a fluid bed.

13. Process according to claim 12 wherein the temperature in the mixer is from 10° to 60° C. and wherein the temperature of the fluid bed is from 50° to 90°.

14. Alkali metal percarbonate particles obtained by a process according to any one of claims 1 to 4.

15. In a washing or bleaching composition containing alkali metal percarbonate particles, the improvement wherein the percarbonate particles are obtained by a process according to any one of claims 1 to 4.

* * * * *